United States Patent [19]

Katsuyama et al.

[11] Patent Number: 4,870,698
[45] Date of Patent: Sep. 26, 1989

[54] OUTPUT POWER CONTROL CIRCUIT FOR A MOBILE RADIO APPARATUS

[75] Inventors: Tsutomu Katsuyama; Isao Yoshida; Toyoo Kanai; Yasunobu Taguchi, all of Tokyo, Japan

[73] Assignee: Oki Electric Industry Co., Ltd., Tokyo, Japan

[21] Appl. No.: 113,115

[22] Filed: Oct. 27, 1987

[30] Foreign Application Priority Data

Oct. 29, 1986 [JP] Japan .................... 61-255932
Oct. 26, 1987 [JP] Japan .................... 62-268137

[51] Int. Cl.⁴ .................................. H04B 17/00
[52] U.S. Cl. .................................. 455/67; 455/69; 455/117; 455/127
[58] Field of Search .............. 455/69, 70, 67, 127, 455/128, 117, 115, 343, 226; 330/129, 278, 279, 284, 289, 298

[56] References Cited

U.S. PATENT DOCUMENTS

| | | |
|---|---|---|
| 4,041,396 | 8/1977 | Fedde . |
| 4,158,180 | 6/1979 | Challen .................. 455/117 |
| 4,447,783 | 5/1984 | Quick ..................... 455/115 |
| 4,523,155 | 6/1985 | Walczak et al. . |
| 4,593,409 | 6/1986 | Miller .................... 455/127 |
| 4,602,218 | 7/1986 | Vilmur et al. . |
| 4,613,990 | 9/1986 | Halpern .................. 455/69 |
| 4,654,882 | 3/1987 | Ikeda ..................... 455/117 |
| 4,709,403 | 11/1987 | Kikuchi ................. 455/117 |
| 4,723,304 | 2/1988 | Maeda .................... 455/69 |

FOREIGN PATENT DOCUMENTS 0035569 3/1980 Japan ........................ 455/69

Primary Examiner—Robert L. Griffin
Assistant Examiner—Curtis Kuntz
Attorney, Agent, or Firm—Wenderoth, Lind & Ponack

[57] ABSTRACT

An output power control circuit is provided in a casing of a mobile radio apparatus together with an automatic power control circuit and an RF signal amplifier. The output power control circuit applied level control signals to the automatic power control circuit for maintaining the power level of the output RF signal of the RF amplifier at one of a plurality of output power levels corresponding to the level control signals. The output power control circuit has a receiver, a temperature sensing circuit and a logic circuit. The receiver receives RF signals transmitted by a master station and detects power level setting command signals included in the received RF signal. The temperature sensing circuit detects an internal temperature of the casing and provides a power reduction signal upon detecting that the internal temperature has exceeded a predetermined temperature. The logic circuit receives the power level setting command signal from said receiver, and generates a level control signal for determining an output power level corresponding to the power level setting command signal, and generates a level control signal for determining an output power level which is lower than that specified by the power level setting command signal upon receiving the power reduction signal from the temperature sensing circuit.

12 Claims, 5 Drawing Sheets

| Fig. 3 A |
| Fig. 3 B |

OUTPUT POWER CONTROL CIRCUIT FOR A MOBILE RADIO APPARATUS

BACKGROUND OF THE INVENTION

The present invention relates to an output power control circuit for controlling the output level of a RF (radio frequency) signal amplifier employed in a mobile radio apparatus such as a mobile telephone and, more specifically, to an output power control circuit which supplies output power level control signals to a RF signal amplifier to determine the output power level of the RF signal amplifier selectively.

A mobile radio apparatus must be formed in a compact construction so that the mobile radio apparatus can be placed in a small space in an automobile or so that the mobile radio apparatus is handy for carrying about. Accordingly, the mobile radio apparatus employs compact electronic parts to reduce the size of the casing thereof. Reduction in size of the casing entails a problem that the internal temperature of the mobile radio apparatus, namely, the temperature inside the casing, is caused to rise to an upper limit temperature, for example, 85° C., guaranteeing the rated performance of the mobile radio apparatus in a short time by the heat generated by the electronic components, mainly by the heat generated by an RF signal amplifier.

Particularly, when the RF signal amplifier provides RF signals at the maximum power, for example, three watts, the RF signal amplifier generates heat at a high rate, which further reduces the time in which the internal temperature of the casing rises to a predetermined upper limit temperature.

Incidentally, the output power level of the RF amplifier is maintained at a stable output power level by an automatic power control circuit (hereinafter abbreviated as an "APC" circuit).

As described in detail in U.S. Pat. Nos. 4,523,155 and 4,602,218, the conventional APC circuit maintains the output power level of the RF signal amplifier at one of a plurality of output power levels which are selected by a plurality of level control signals, namely, parallel input bit patterns, and level control signals to be supplied to the APC circuit are set according to power setting command signals transmitted through a control channel or a voice channel by a master station. Accordingly, the mobile radio apparatus is unable to lower the output power level thereof independently even when the internal temperature of the casing thereof reach the predetermined upper limit temperature. In such a case, the mobile radio apparatus disconnects the power source automatically to interrupt the transmission of RF signals, namely, to prevent communication, until the internal temperature drops below the upper limit temperature.

SUMMARY OF THE INVENTION

Accordingly, it is an object of the present invention to provide an output power control circuit for a compact mobile radio apparatus, capable of extending the available time of continuous communication by reducing the rising rate of the internal temperature of the casing of the mobile radio apparatus.

It is further object of the present invention to provide an output power control circuit for a mobile radio apparatus, capable of generating level control signals for controlling the output power level of the RF signal amplifier without spoiling the dependency on power level setting command signals given thereto by a master station.

According to one aspect of the present invention, an output power control circuit for a mobile radio apparatus having a casing, an APC circuit and a RF signal amplifier, provided in the casing of the mobile radio apparatus and adapted to apply level control signals to the APC circuit for maintaining the magnitude of the output RF signal of the RF signal amplifier at one of a plurality of output power levels corresponding to the level control signals, which comprises:

a receiver which receives RF signals transmitted by a master station and detects power level setting command signals included in the RF signals;

a temperature sensing circuit which detects the internal temperature of the casing and provides a power reduction signal upon the detection of the internal temperature exceeding a predetermined temperature; and a logic circuit which receives the power level setting command signal from the receiver, generates a level control signal for determining an output power level corresponding to the power level setting command signal, and generates a level control signal for determining an output power level which is lower than that specified by the power level setting command signal upon the reception of a power reduction signal from the temperature sensing circuit.

DETAILED DESCRIPTION OF THE PREFERRED EMBODIMENT

Figure 1:
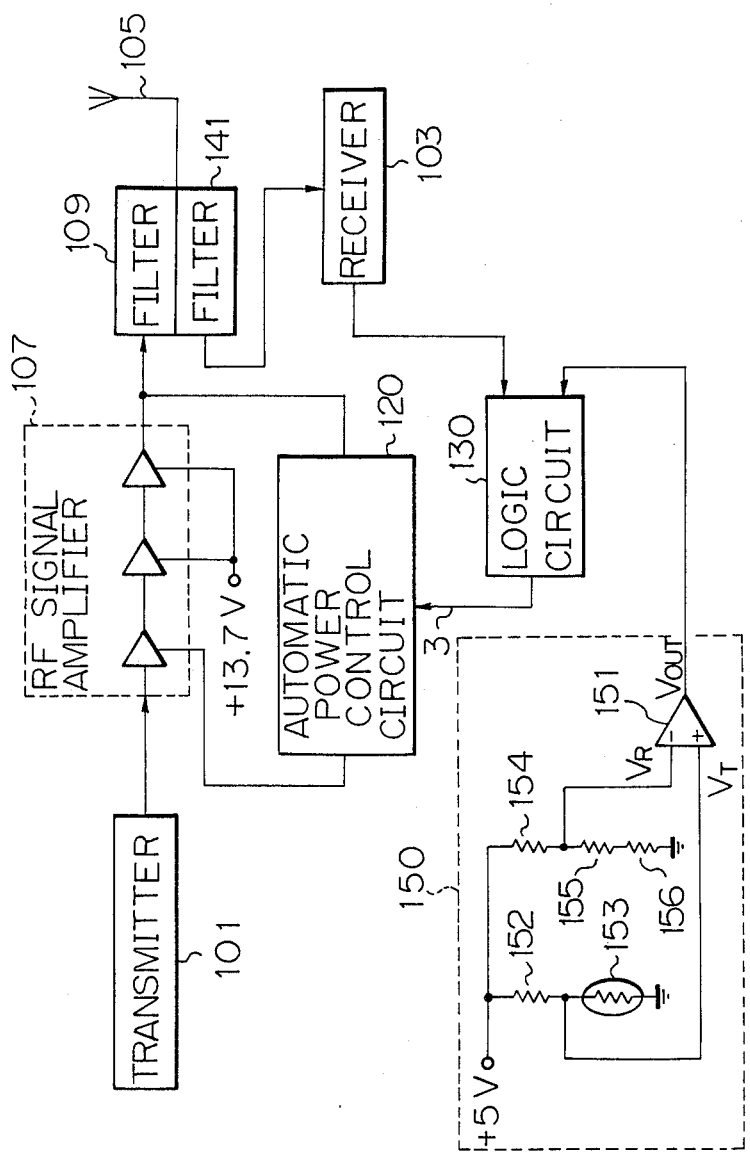
FIG. 1 is a block diagram of an output power control circuit for a mobile radio apparatus, in a preferred embodiment, according to the present invention.

FIG. 1 illustrates a mobile radio apparatus incorporating an output power control circuit, in a preferred embodiment, according to the present invention. The mobile radio apparatus has a conventional transmitter 101, a conventional receiver 103 and a conventional antenna 105. The transmitter 101 feeds RF (radio frequency) signals to a conventional RF signal amplifier 107. The RF signal amplifier 107 amplifies the input RF signals and supplies output RF signals, namely, amplified Rnput RF signals, through a conventional bandpass filter 109 to the antenna 105. The output power level of the RF signal amplifier 107 is determined by the voltage supplied to the RF signal amplifier 107 by a conventional automatic power control circuit 120 (hereinafter abbreviated as an "APC circuit").

The APC circuit 120 detects the magnitude of the output RF signal of the RF signal amplifier 107 to maintain the output power level of the RF signal amplifier at one of several different output power levels corresponding to a plurality of level control signals. In this embodiment, the level control signals are APC command signals represented by 3-bit binary codes produced by a logic circuit 130. The respective actual values of the APC command signals respectively corresponding to eight different output power levels are in the range of about 6.8 dBm to about 34.8 dBm.

When the logic circuit 130 produces an APC command signal of "000", the output power level of the RF signal amplifier 107 rises to the maximum output power level of 34.8 dBm. The output level of the RF signal amplifier is determined by the APC command signal. That is, when the APC command signal increases by an increment of "1" from "000" to "001", the output power level of the RF signal amplifier 107 decreases by a decrement of 4 dB from 34. 8 dBm to 30.8 dBm. When the APC command signal is "111", the output power level of the RF signal amplifier 107 is 6.8 dBm, which is the minimum output power level of the RF signal amplifier 107.

The logic circuit 130 receives, through the antenna 105 and a conventional bandpass filter 141 and the receiver 103, power setting (hereinafter abbreviated as "PS") command signals transmitted through a control channel or voice channel by a master station (not shown). The PS command signal commands the logic circuit 130 to set the magnitude of the output of the RF signal amplifier 107 at the corresponding output power level. The output terminal of a temperature sensing circuit 150 provided in the casing of the mobile radio apparatus is connected to the input terminal of the logic circuit 130 so as to apply an output voltage Vout to the logic circuit 130.

The temperature sensing circuit 150 comprises an operational amplifier 151, a resistor 152 having a value of 4.7 kΩ, a thermistor 153 having a value of 1.9 kΩ at 75° C., a resistor 154 having a value of 4.53 kΩ, a resistor 155 having a value of 160 Ω and a resistor 156 having a value of 1.6 kΩ.

The plus input terminal of the operational amplifier 151 is connected through the resistor 152 to a voltage source of +5 V and is grounded through the thermistor 153. The minus input terminal of the operational amplifier 151 is connected through the resistor 154 to the voltage source and is grounded through the resistors 155 and 156.

Figure 2:
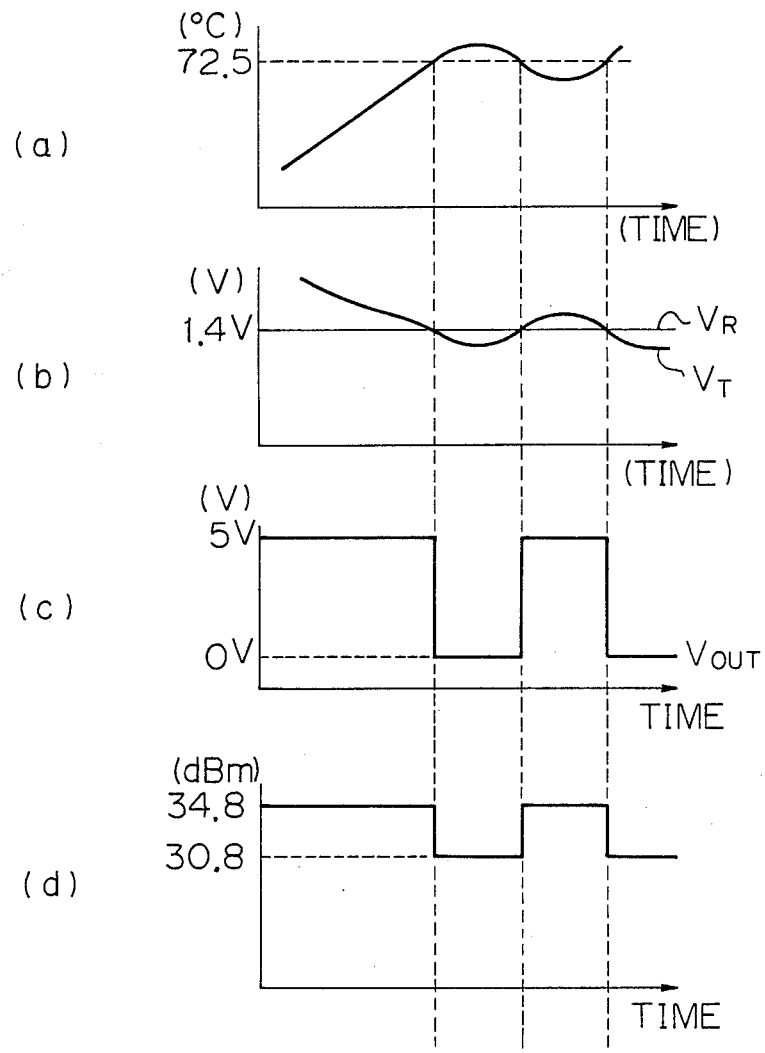
FIGS. 2(a), 2(b), 2(c) and 2(d) are graphs showing the variation of the internal temperature of the casing of a mobile radio apparatus with time, the variation of voltage applied to the plus input terminal of an amplifier according to the internal temperature with time, the variation of the output voltage of the amplifier according to the voltage applied to the plus input terminal of the same with time, and the variation of the output power level of an RF signal amplifier according to the internal temperature with time, respectively.

As shown in FIGS. 2(a) and 2(b), A fixed voltage $V_R$ of approximately 1.4 V is applied to the minus input terminal of the operational amplifier 151 regardless of the variation of the internal temperature of the casing. A voltage $V_T$ is applied to the plus input terminal of the operational amplifier 151. The voltage $V_T$ is higher than the voltage $V_R$ when the internal temperature is the room temperature, and is lower than the voltage $V_R$ when the internal temperature is in a temperature range above approximately 72.5° C. As shown in FIG. 2(c), the output voltage Vout of the operational amplifier 151 applied to the logic circuit 130 is 5 V when the voltage $V_T$ is higher than the voltage $V_R$, and is 0 V when the voltage $V_T$ is equal to or lower than the voltage $V_R$.

Figures 3, 3A:
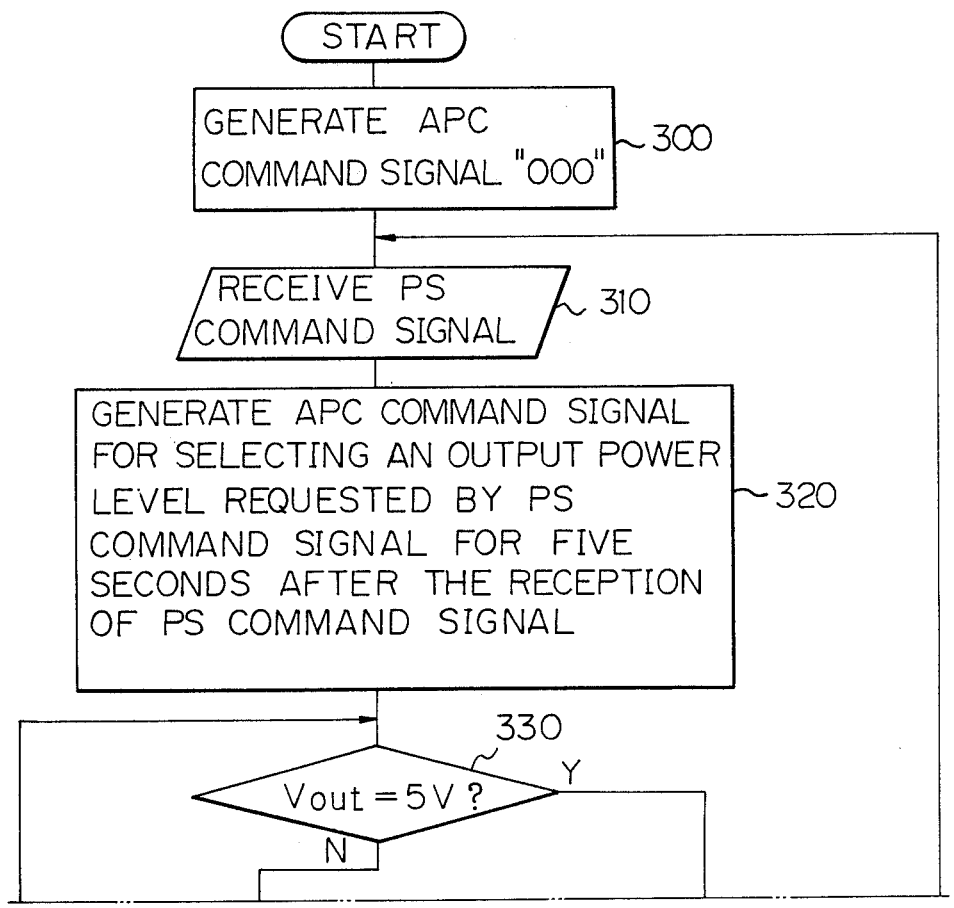
FIGS. 3(a)–3(b) is a flowchart showing steps of a control program to be executed by a logic circuit employed in the output power control circuit of FIG. 1.
Figure 3B:
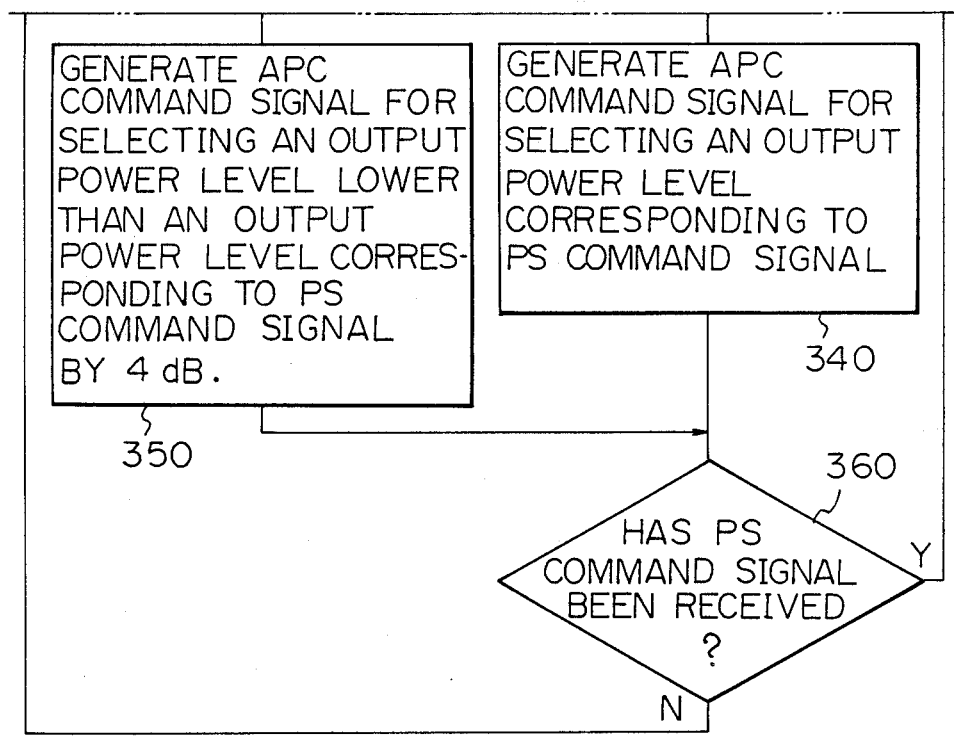

The manner of operation of the logic circuit 130 will be described hereinafter with reference to FIG. 3.

Upon the connection of the mobile radio apparatus to the power source (not shown), the logic circuit 130 generates an APC command signal of "000" in Step 300. Then, the logic circuit 130 receives a PS command signal in Step 310. Upon the reception of the PS command signal, the logic circuit 130 generates an APC command signal for selecting an output power level corresponding to the PS command signal for five seconds in Step 320 After the passage of five seconds from the reception of the PS command signal, in step 330, when the output voltage Vout is 5 V, it means that the internal temperature is below the upper limit temperature, and the logical circuit 130 generates an APC command signal for selecting an output power level corresponding to the PS command signal in step 340, and then executes step 360.

In step 330 when the output voltage Vout of the temperature sensing circuit 150 is 0 V, and the output level of the RF amplifier is maximum, the logical circuit 130 generates an APC command signal for selecting an output power level lower than the output power level corresponding to the PS command signal by 4 db in step 350, and then executes step 360. In Step 360, the logic circuit 130 determines if a new PS command signal is received. If a new PS command signal is fed to the logic circuit 130, then the logic circuit 130 executes Step 310 and, if not, the logic circuit 130 executes Step 330.

Figure 4:
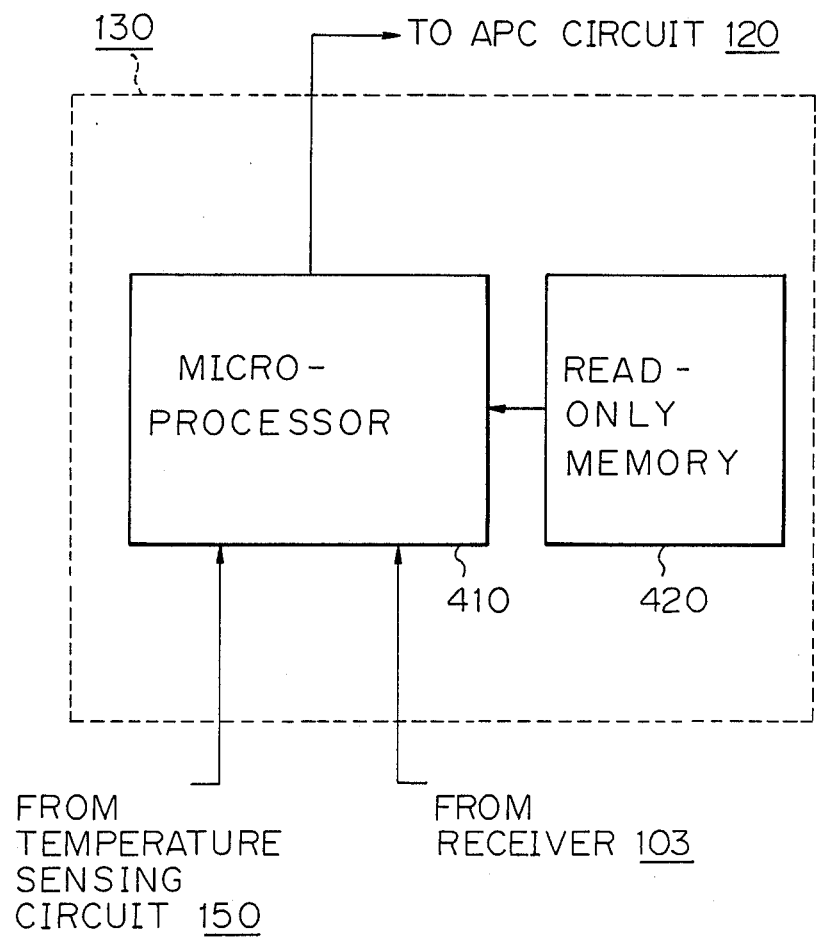
FIG. 4 is a block diagram showing in detail a logic circuit according to the present invention.

As shown in FIG. 4, the logic circuit 130 comprises a microprocessor 410 such as an OKI type IC No. 80C85 and a read-only memory 420 such as a FUJITSU type erasable programmable read-only memory No. MBC 27C256. The microprocessor 410 receives a PS command signal from the receiver 103 and an output voltage Vout from the temperature sensing circuit 150 and applies an APC command signal generated under the control of the read-only memory 420 to the APC circuit 120.

Thus, the logic circuit 130 controls the output power level of the RF signal amplifier 107 so as to be at 34.8 dBm when the internal temperature is lower than approximately 72.5° C., and so as to be at 30.4 dBm when the internal temperature is approximately 72.5° C. or higher as shown in FIG. 2(d), notwithstanding the PS command signal requesting an output power level of 34.8 dBm.

Since the internal temperature of a casing having a volume of approximately 800 cm³ rises to approximately 72.5° C. or higher when the ambient temperature is in the range of −30° C. to +60° C. and the output power level of the RF signal amplifier 107 is 34.8 dBm, the logic circuit 130 generates an APC command signal of "001" when the output voltage Vout of the temperature sensing circuit 150 is 0 V.

What is claimed is:

1. An output power control circuit for a mobile radio apparatus having a casing, an automatic power control circuit and an RF signal amplifier, provided in the casing of the mobile radio apparatus and adapted to apply level control signals to the automatic power control circuit for maintaining the power level of the output RF signal of the RF amplifier at one of a plurality of output power levels corresponding to the level control signals, which comprises:

a receiver means for receiving RF signals transmitted by a master station and for detecting power level setting command signals included in said received RF signals;

a temperature sensing circuit for which detecting the internal temperature of the casing and for providing a power reduction signal upon detecting that said internal temperature has exceeded a predetermined temperature; and a logic circuit for receiving said power level setting command signal from said receiver means, and for generating a level control signal in digital form for determining an output power level corresponding to said power level setting command signal, and for generating a level control signal for determining an output power level which is lower than that specified by said power level setting command signal upon receiving said power reduction signal from said temperature sensing circuit.

2. An output power control circuit according to claim 1, wherein said logic circuit generates a level control signal for selecting an output power level corresponding to said power setting command signal for predetermined period of time.

3. An output power level control circuit according to claim 1, wherein said temperature sensing circuit continuously generates said power reduction signal when said internal temperature of the casing exceeds said predetermined temperature.

4. An output power level control circuit according to claim 1, wherein said logic circuit continuously generates said level control signal.

5. An output power level control circuit according to claim 1, wherein said logic circuit generates, upon receiving said power reduction signal, a level control signal for selecting a reduced output power level which is nearest to an output power level requested by said power setting command signal.

6. An output power level control circuit according to claim 5, wherein said logic circuit generates said level control signal for selecting an output power level corresponding to said power setting command signal for a predetermined period of time.

7. An output power level control circuit according to claim 5, wherein said temperature sensing circuit continuously generates said power reduction signal when said internal temperature of the casing exceeds said predetermined temperature.

8. An output power level control circuit according to claim 5, wherein said logic circuit continuously generates said level control signal.

9. An output power control circuit for controlling an output power level of a mobile radio apparatus having a casing, an automatic power control circuit and an RF signal amplifier, provided in the casing of the mobile radio apparatus and adapted to apply a level control signal to the automatic power control circuit for selecting the output power level in accordance with the level control signal, comprising:

a receiver means for receiving an RF signal transmitted by a master station and for detecting a power level setting command signal included in the received RF signal;

a temperature sensing circuit for detecting the internal temperature of the casing and for providing a power reduction signal upon detecting that the internal temperature of the casing has exceeded a predetermined temperature, and a logic circuit for receiving the power level setting command signal from the receiver means, and for generating a level control signal for determining the output power level;

wherein the logic circuit generates a level control signal for selecting an output power level which is lower than that specified by the power level setting command signal when the power reduction signal is received from the temperature sensing circuit and the power level of the RF signal amplifier is at a maximum value.

10. An output power control circuit according to claim 9, wherein the logic circuit generates a level control signal for selecting the output power level in accordance with the power setting command signal for a predetermined period of time.

11. An output power control circuit according to claim 9, wherein the temperature sensing circuit continuously generates the power reduction signal when the internal temperature of the casing exceeds a predetermined temperature.

12. An output power control circuit according to claim 11, wherein the logic circuit continuously generates the power control signal.

* * * * *